United States Patent [19]

Hannigan

[11] 4,238,785
[45] Dec. 9, 1980

[54] ZERO-DOPPLER SHIFT POSITIONING TECHNIQUE

[75] Inventor: Joseph F. Hannigan, Springfield, Va.

[73] Assignee: The United States of America as represented by the Secretary of the Army, Washington, D.C.

[21] Appl. No.: 519,470

[22] Filed: Oct. 25, 1974

Related U.S. Application Data

[62] Division of Ser. No. 402,491, Oct. 11, 1973, Pat. No. 4,203,115.

[51] Int. Cl.³ .............................................. G01S 5/02
[52] U.S. Cl. .................................. 343/112 D; 343/8; 343/112 R
[58] Field of Search ............... 343/8, 112 CA, 112 D, 343/113 DE, 112 R

[56] References Cited

U.S. PATENT DOCUMENTS

| | | | |
|---|---|---|---|
| 3,195,136 | 7/1965 | Klein | 343/112 CA |
| 3,256,519 | 6/1966 | Dewey et al. | 343/8 X |
| 3,754,253 | 8/1973 | Balsiger | 343/8 X |
| 3,772,694 | 11/1973 | Sato et al. | 343/8 X |
| 3,778,823 | 12/1973 | Sato et al. | 343/8 UX |
| 3,859,660 | 1/1975 | Augustine et al. | 343/8 X |

*Primary Examiner*—T. H. Tubbesing
*Attorney, Agent, or Firm*—William G. Gapcynski; Frank R. Agovino; Werten F. W. Bellany

[57] ABSTRACT

A system for locating forward observation posts with respect to a base station. A continuous electromagnetic wave with frequency $f_o$ is transmitted from an artillery projectile or missile in flight. In addition, a relative time code is transmitted on the same or a separate carrier frequency either from the projectile or from a ground station. The frequency $f_o$ of the electromagnetic wave from the projectile or missile is doppler shifted above or below its basic frequency due to the velocity of the projectile. This doppler signal $f_d$ always goes through its basic frequency $f_o$ or zero doppler at a point which is representative of and identifies an observer's position in the horizontal or subtrack direction of the projectile. This occurs regardless of the observer's distance away from the subtrack. Thus, all observers on a given perpendicular to the subtrack observe $f_o$ or zero doppler at the same time. To locate a specific observer, two projectiles or missiles must be fired. The observer is located at the intersection of two such perpendiculars. Any number of observers or sensors can be located with two projectiles of missiles. The relative time at which this zero doppler occurs for each observer is obtained from a time code transmission. This time code is also used to identify the position of the projectile at any time during its flight. The time of flight of the projectile until the referenced frequency is received, determined by each observation post, is sent to the base station so positions may be calculated from firing tables, from the projectile's velocity (only the horizontal component is required) or by actually counting cycles from the projectile to a reference base station, the cycles being equated to units of distance. A combination of the above can be used to improve the accuracy of locating any position of the projectile.

4 Claims, 11 Drawing Figures

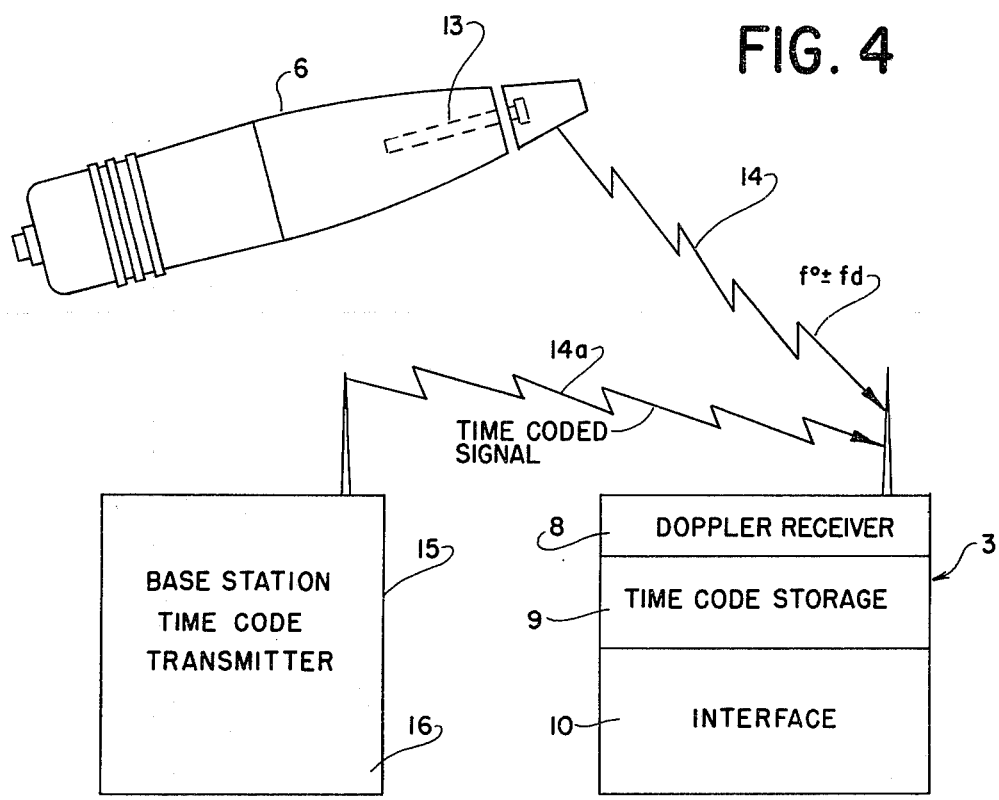
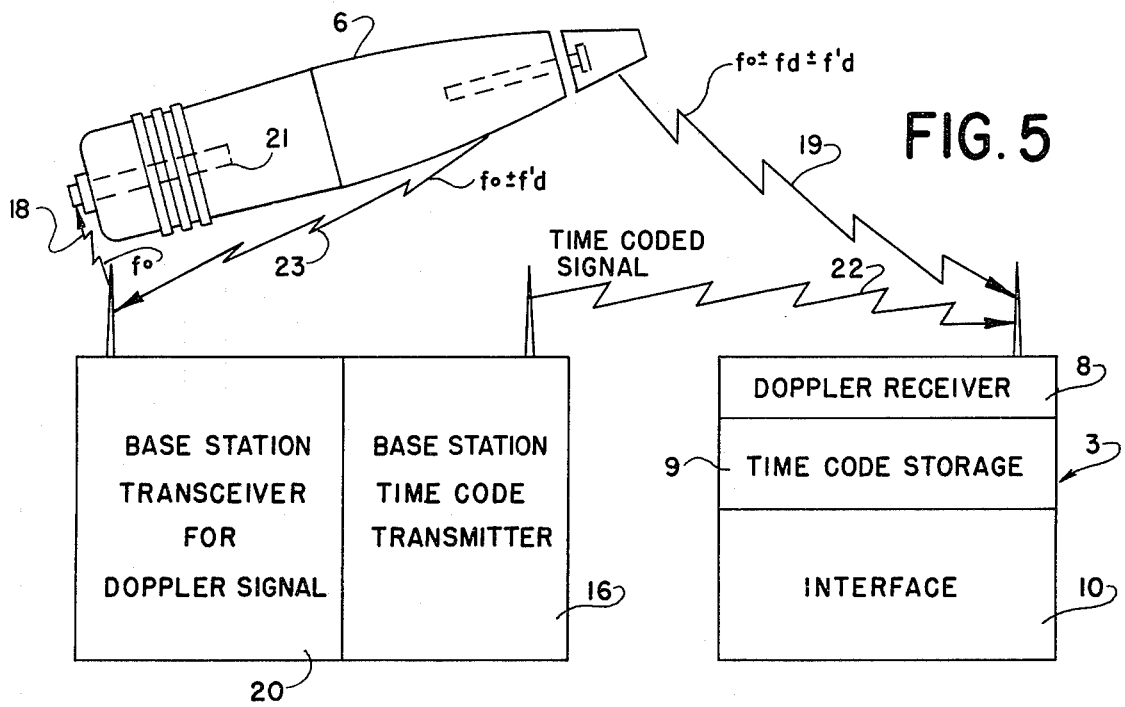

ZERO-DOPPLER SHIFT POSITIONING TECHNIQUE

The invention described herein may be manufactured and used by or for the Government for governmental purposes without the payment of any royalty thereon.

This is a division, of application Ser. No. 402,491, filed Oct. 11, 1973, now U.S. Pat. No. 4,203,115.

BACKGROUND OF THE INVENTION

1. Field of the Invention

This invention relates to a system for determining locations by detecting doppler shift in radio signals. If a projectile carries on board a means for continuously transmitting a fixed frequency signal this signal will be received by a ground station as a changing frequency as the relative velocity between the projectile and the ground station changes. This is a classical phenomenon given by the formula:

$$f = f_o \pm (v/c) \text{ for}$$

where p0 f = the frequency received by ground station
fo = the fixed frequency of the transmitter
v = the relative velocity between projectile and observer
c = the velocity of light To utilize this principle for position location, two projectiles carrying transmitters must be fired, at different, known, relative azimuth angles, so their paths are not parallel.

As such a projectile passes an observation post the frequency of the signal received will decrease and pass through the standard frequency transmitted by the projectile and continue to decrease. When the observer receives the same frequency signal as was transmitted it means that the relative velocity between the observer and projectile is zero. This can occur only at one position, that is when the observer and the projectile lie in some reference plane, perpendicular to the horizontal direction of the projectiles flight, the observer further being located on the line of intersection of this reference plane with the surface of the earth. When two projectiles are used there will be two such lines located on the surface of the earth. These two lines will intersect at a point which is the observer's position.

Inherent in this analysis is a means of determining the location of the projectile at any time during its flight so as to fix the location of the reference plane. This is done by timing the projectiles flight and noting the time when the reference frequency is received by an outpost. This information with tables of projectile trajectories will fix the projectile's position along the path of flight.

It has been found that the doppler curves obtained from the parabolic-type trajectory of a projectile have the same fundamental characteristics of doppler curves as a body travelling in a straight line; any given point on the parabola has a corresponding point on the subtrack, X-axis, for which a zero doppler is the same for all observers at the same distance along the subtrack regardless of the observer's distance away from the subtrack. These points of zero doppler correspond to a specific time in the trajectory of the projectile.

In general, it is assumed that the velocity of the projectile is constant which further infers that the direction and velocity do not change. The motion of a projectile is continually changing because of friction of the atmosphere but the speed deviates only slightly from the average. It was found, however, that despite velocity change due to change in direction there was still a unique point of zero doppler for all observers on a specific, unique normal or perpendicular to the subtrack.

Only a single outpost has been considered, however, since each outpost operates independently and does not interfere with any other, a multiplicity of outposts may determine their positions by the firing of only two projectiles.

The system herein described may be used for civil as well as military applications. For example, unmanned sensors may be airdropped at positions not readily accessible by other means. By firing two projectiles and determining the point of zero doppler and the relative time of zero doppler for each sensor position, rough surveying to compute land areas and surveys of natural resources can be quickly and economically determined.

2. Description of the Prior Art

The doppler phenomenon has been used in many systems for many purposes from doppler satellites for navigation to doppler radar for automobile speed traps.

Various systems have been developed using the doppler shift phenomenon of which the following U.S. Patents are representative.

U.S. Pat. No. 3,351,943 by George B. Bush et al appears to be the closest reference of the patented art to the subject invention and is representative of attempts to locate the position of objects on the face of the earth by the use of satellites. This patent teaches the use of a satellite carrying a transmitter wherein the satellite transmits a continuous wave of fixed frequency as it orbits and which beats against a reference signal at the observer station to produce a doppler signal. Ships at sea and other observers who desire the compute their location, monitor the satellite transmissions and when correlation of sequential doppler signals exists the satellite and the observer are closest.

It is recognized that there must be a certain number of satellites in suitable orbits to provide the required information for determining the navigational positions of observers.

The system of this patent has several inherent characteristics which make this system inadequate for military use in locating forward field outposts. First, the satellite has a definite period and its time of availability is available to everyone thus subjecting the system to electronic countermeasures. Second, the satellites are available only during certain times and not at the will of the user. Finally, the satellite is an expensive means for establishing a system intended for localized use and does not lend itself to random reference frequency calibration at the will of the user.

U.S. Pat. No. 3,254,341 by Georges Broussand is similar to the subject invention in that the doppler shift technique is used. This patent teaches use of a satellite carrying a transmitter wherein the satellite transmits a continuous wave of fixed frequency as it orbits. Ships at sea and other observers who desire to compute their location monitor the satellite transmissions and a clock at the observer which is apparently in a phase locked loop with a clock on board the satellite. Successive measurements of the signals doppler shift are made and all the possible positions which could receive such a shift are plotted knowing the satellites path. This technique results in a family of hyperbola which intersect at two points, one of which is the position of the observer.

Since this system operates on such a large expense this ambiguity can easily be resolved by the observer generally knowing in which quadrant of the globe he is. The patent recognizes limitation by stating, "Provided the ambiguity as to the sign of $X_o$ is removed, the point where the signals are received from the satellite can be determined by determining the hyperbola and their points of intersection."

There is another embodiment of this patent wherein a single doppler shift is intercepted and positions plotted. The distance from the satellite to the observer is also plotted. This results in the intersection of a circle and a hyperbola; again two solutions. It is of course recognized that there is one special case when these solutions are exact and that is when the satellite passes directly over the observer.

The system described by this patent is inadequate in that not only does it have all the inherent limitations of all satellite systems as previously mentioned but it also does not give an exact solution. When operating in a localized area an exact solution is necessary. Also, the ambiguity of this system is even more difficult to resolve as these two solutions approach each other, which is the case at points close to earth.

The present system is an improvement over the prior art in that the point of zero doppler and the relative time of the zero doppler for each observer are the only parameters required. These together with the known and controlled geometry of the subtrack, X-axis, of the projectile or missile determine the positions of any number of observers. All of the data required to locate an unlimited number of observers is obtained in only the time required to fire two artillery projectiles or missiles.

SUMMARY OF THE INVENTION

The invention comprises a system wherein forward observation posts may determine their positions with respect to a base station by the firing of at least two projectiles with on board transmitters. These projectiles are propelled along paths which have different, known, relative azimuth angles. As each projectile travels along its trajectory it emits a continuous fixed reference frequency. This transmitted signal is heard as a changing frequency signal due to the doppler shift caused by the changing relative motion between the projectile and the observer.

When the projectile passes the observer, there will be a point where the reference frequency is received indicating zero relative velocity between the projectile and observer. This occurs when the projectile and the observer lie in a reference plane which is perpendicular to the plane containing the projectiles path of flight. The observer's position will lie on the line of intersection of this reference plane with the surface of the earth. When two projectiles are used two such lines can be plotted. The intersection of these two lines is the exact location of the observer. A timing signal and trajectory tables are used to monitor the projectiles position everywhere along its path so that at the moment the reference signal is observed by an outpost, the position of each projectile is determined and then by using the reference planes the position of the observer can be determined.

It is the principal object of this invention to provide a system for rapidly determining the location of observers.

Another object of this invention is to provide a system for determining the location of observers at any time at the will of the user.

It is an object of this invention to provide a system for determining the position of observers by using only the point of zero doppler and the relative time of zero doppler for each observer's position.

It is an object of this invention to provide a system for determining the position of an unlimited number of observers during the time required for travel of two vehicles on trajectories having different, known, relative azimuth angles.

It is also an object of the invention to provide a system for determining the position of observers which has electronic counter measure capability, is rapidly available, lightweight, reliable, economic and accurate in a tactical environment.

It is not intended that the use of the term observers be limiting. It is recognized that there may be one or more observers and that these observers may be unmanned sensors, manned radio equipment or any other means for receiving a radio signal.

BRIEF DESCRIPTION OF THE DRAWINGS

FIG. 4 is a third embodiment using a single frequency projectile transmission and a single frequency base station transmission.

FIG. 5 is a fourth embodiment using a dual frequency base station transmission and a projectile transponder transmission.

DESCRIPTION OF THE PREFERRED EMBODIMENTS

Figure 1:
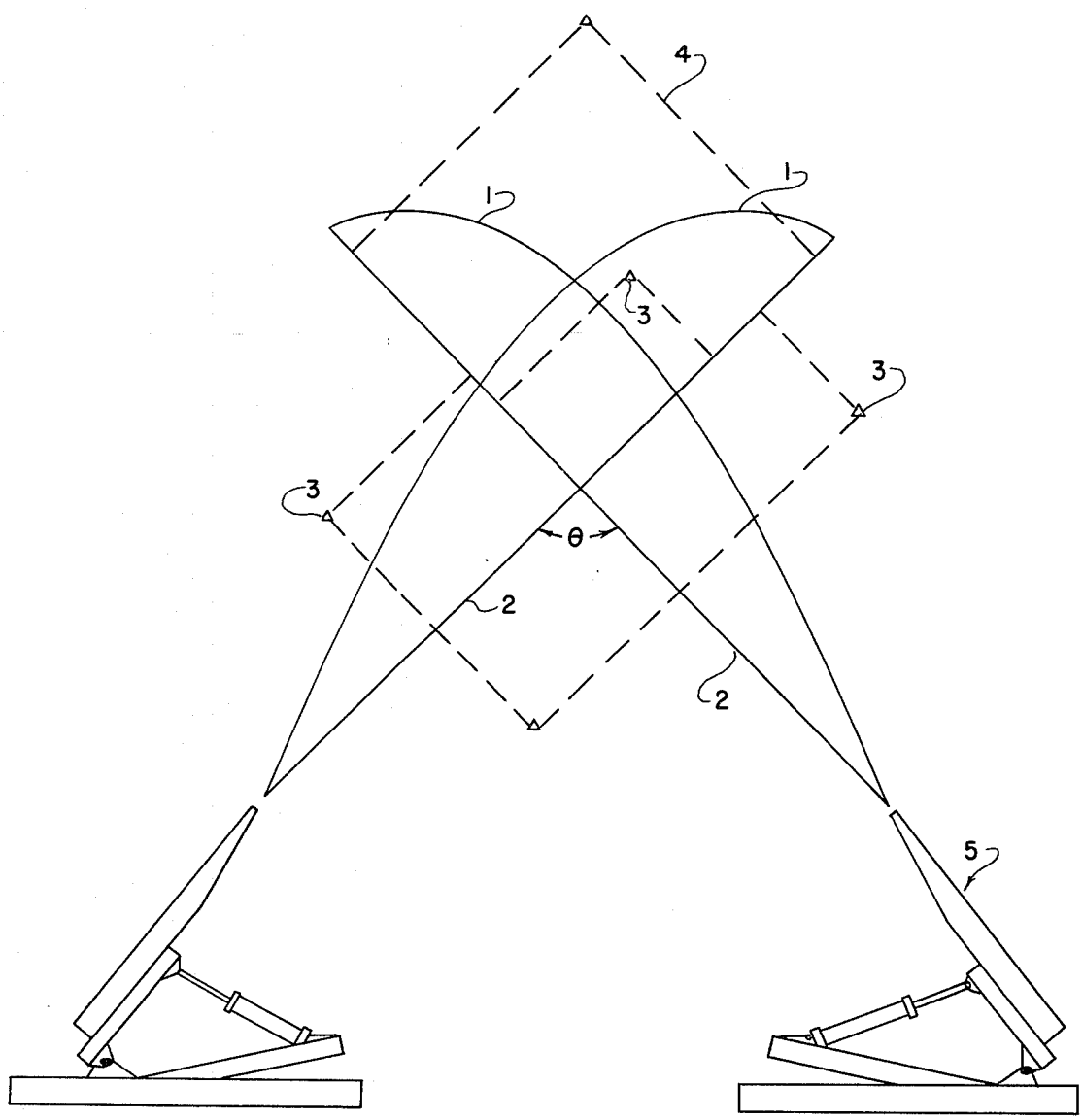
FIG. 1 is a pictorial representation of the positioning technique.

Reference is made to FIG. 1 showing the geometrical relations of the trajectory 1 and subtrack 2 of each of two projectiles successively propelled through the atmosphere at different known, relative azimuth angles $\theta$ such that the paths are not parallel. Each projectile must pass the observers position 3, which is to be determined.

Each of these projectiles carries a means for transmitting electromagnetic signals to one or more observers 3 thereby allowing position calculation upon detection of an absence of doppler shift and monitoring of the time of projectile flight by computing the relationship of the projectiles track 2 and the intersection of the reference plane 4 containing the projectile and the observer, with the earth's surface. There are at least six embodiments as indicated hereafter. It is recognized that the source 5 of the projectiles need not be different as shown in FIG. 1, by noting that the paths are only required to be non-parallel which can be accomplished by firing from one position as well as several.

These projectiles may be artillery projectiles, guided missiles or any other means of carrying the transmitters. It must, however, travel at speeds great enough to cause a significant doppler shift in the electromagnetic signal, which would exclude most manner of vehicles. It has been determined that for detectable doppler shift a projectile fired from a 175 mm gun would have sufficient horizontal velocity to provide a significant doppler shift for observer positions relative to the trajectory.

Implicit in this system is the ability of observers to communicate with their base stations and to receive transmissions from the projectile-borne transmitters. It is therefore contemplated that the observers and base stations will have transmitting means and receiving means as necessary depending on the particular embodiment. It is also contemplated that the projectiles may carry transmitters only or transceivers depending on the particular embodiment. Generally, transmitters and receivers are capable of sending or receiving many different frequencies and it is contemplated that not only at least one such frequency be either transmitted or received but that several may be transmitted or received simultaneously.

Figure 2:
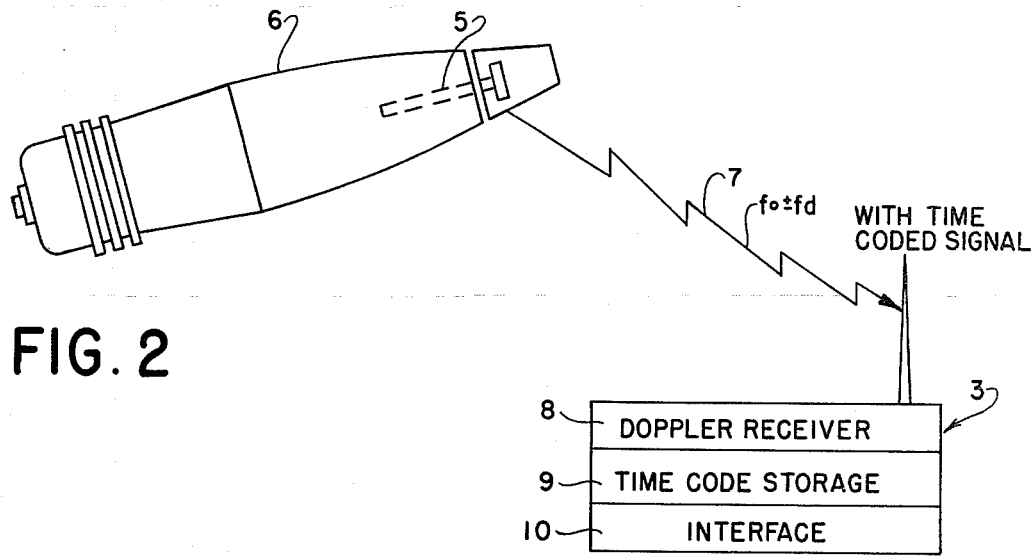
FIG. 2 is a first embodiment using a modulated single frequency projectile transmission.

The first embodiment, FIG. 2, comprises a transmitter 5 carried by a projectile 6, which emits a single continuous carrier frequency 7, symmetrically modulated by a relative time code. The observer 3 has a means for receiving the transmitted modulated carrier 8 and identifying the time of zero doppler, unique for the observer's position. Storage means 9 for storing the time code information is also provided at the observer's position. The time of zero doppler is transmitted to a base station for computation by means of the interface equipment 10.

Figure 3:
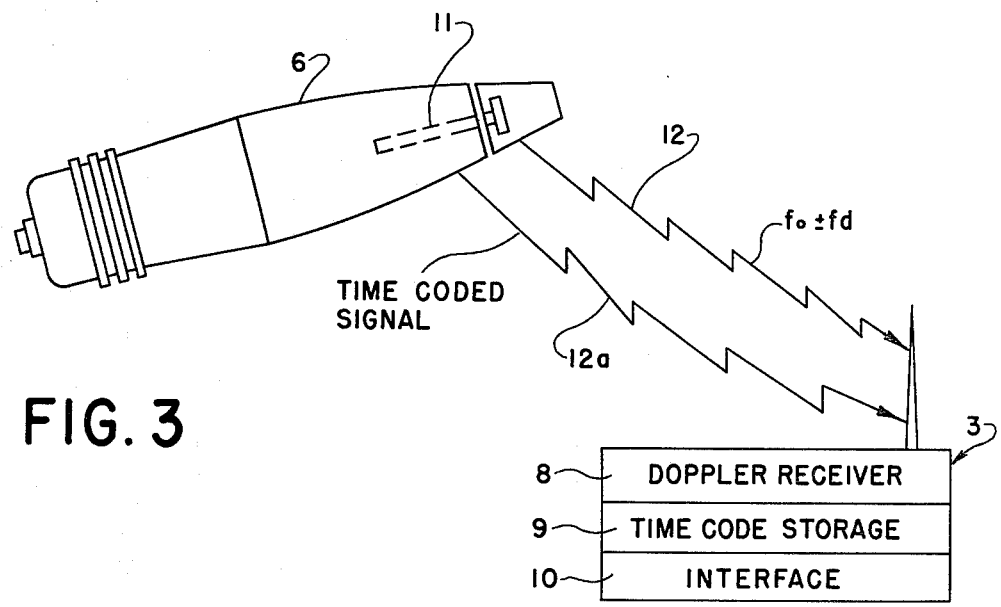
FIG. 3 is a second embodiment using dual frequency projectile transmission.

The second embodiment, FIG. 3, comprises a transmitter 11 carried by a projectile 6. This embodiment is similar to FIG. 2 except that the transmitter emits two separate frequencies 12, 12a, one carrier frequency 12 is modulated by doppler information and is at a higher frequency than 12a which is transmitted simultaneously and is modulated by the time code information. The observer's position as in FIG. 2 is provided with a doppler receiver 8 for identifying the time of zero doppler, unique for the observer position, storage means 9 for storing the time code information and interface equipment 10 for transmitting the time of zero doppler information to a base station for computation of the observer position.

The third embodiment, FIG. 4, comprises a transmitter 13 carried by a projectile 6 which emits a single continuous frequency 14; an observer 3 with a means for receiving the transmitted frequency 8, a means for storing the time code information 9, an interface equipment 10 for transmitting the time of zero doppler information to a base station for computation of the observer position 3, and a base station 15 with a transmitter 16 which emits a continuous carrier frequency 14a, symmetrically modulated with a relative time code. In this embodiment the manner of determining the observer position is the same as in the preceding embodiments except that only the doppler signal is transmitted from the projectile. The relative time code is transmitted to all observers simultaneously from a base station which could be a standard radio net such as the artillery net to all forward observers.

In the fourth embodiment, FIG. 5, a single frequency 18 from which the doppler signal 19 is to be derived is transmitted from the base station 20 to a transponder 21 in the projectile 6 for retransmission to the observer position 3. The transponder 21 may multiply this very stable frequency in order to obtain a greater doppler effect. However, the stability of the transponder output will be matched to the stability of the input by phase-locking or injection-locking techniques. The time code 22 is again transmitted independently by the base station 16. In this embodiment, the base station 20 provided with transceiver means also receives retransmitted doppler frequency 23 which is used to provide a correction to each observer position doppler signal. It can also be used to actually track the projectile and thus improve the trajectory data. The observer's position 3, as in the preceding embodiments, is provided with a doppler receiver 8 for identifying the time of zero doppler, unique for the observer's position, storage means 9 for storing the time code information and interface equipment 10 for transmitting the time of zero doppler information to the base station for computation of the observer position.

Figure 6:
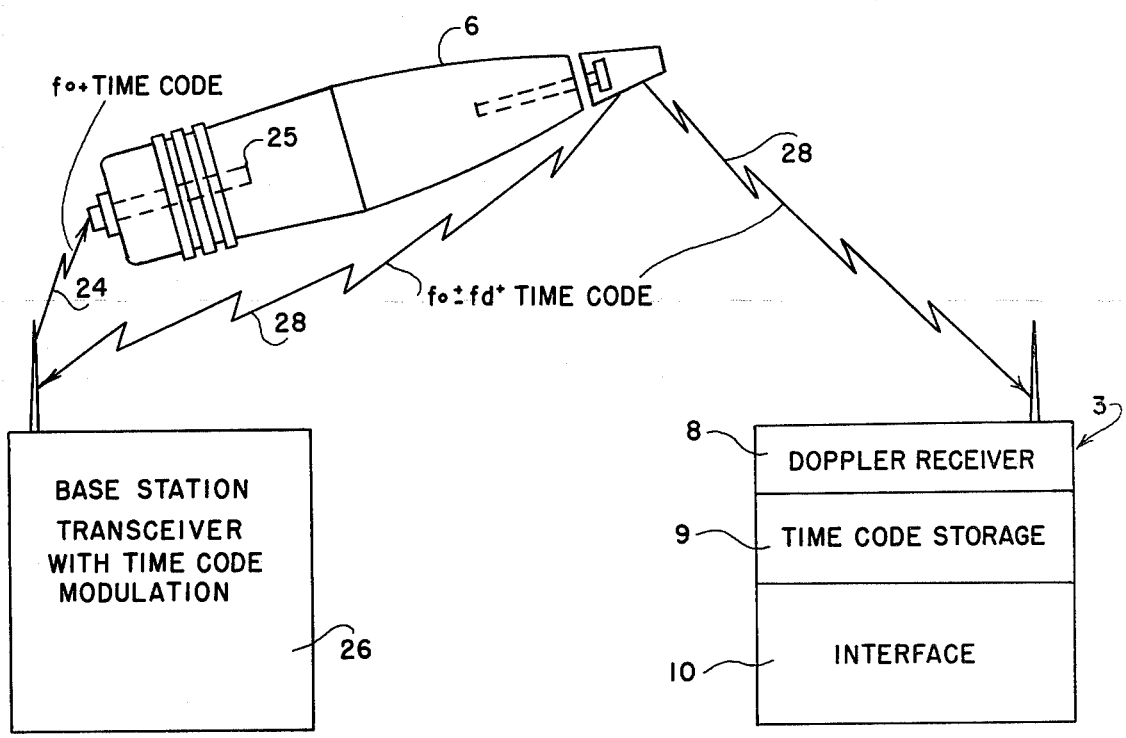
FIG. 6 is a fifth embodiment using a single modulated frequency base station transmission and a modulated projectile transponder transmission.

In the fifth embodiment, FIG. 6, a single carrier frequency 24 with a relative time code modulation is transmitted to the projectile from the base station 26. The phase-lock transponder 25 in the projectile retransmits this signal 28 with the doppler shift to the base station 26 and to all observer positions 3. The transponder signal is also monitored at the base station 26. The same equipment is provided at the observer station in this embodiment as in the preceding embodiments for similar purposes.

Figure 7:
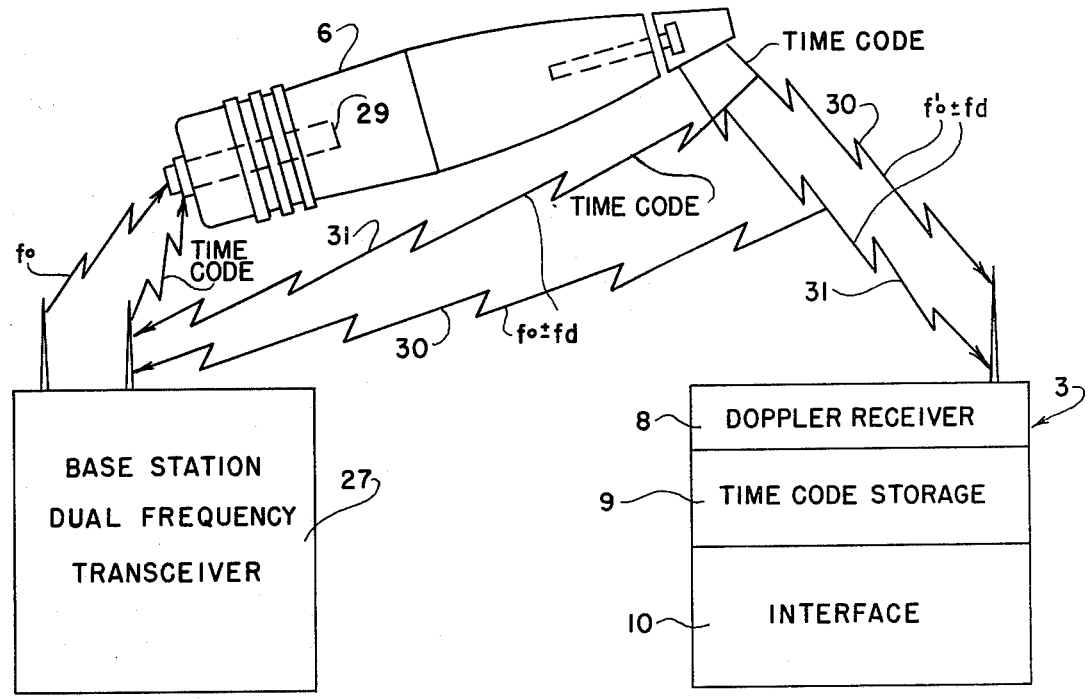
FIG. 7 is a sixth embodiment using a dual frequency base station transmission and a dual projectile transponder transmission.

The sixth embodiment, FIG. 7, is the same as the preceding embodiment except that a dual frequency transponder 29, receiving separate carrier and time code signals from the base station 27 provided with dual frequency transceiver means, is provided to retransmit separate frequencies for the doppler signal 30 and the relative time coded signal 31. Both signals are received by the base station 27 and all observer positions 3.

While the above figures in the drawings show a single projectile it is understood that two similarly operating projectiles are successively fired at known, relatively different azimuth angles to determine the positions of observers.

The observer's doppler receiver must determine the time of zero doppler for its particular location. Each instant of time corresponds to a given position on the subtrack of the trajectory. Doppler frequencies are determined by counting cycles in most systems. While this is still feasible and can be used as a backup, a new method, proposed for this application, involves the use of the linear-response characteristic of an F-M discriminator. Each observer's receiver will be calibrated immediately before firing. Each receiver can be readily calibrated again after the data is taken. However, this should not be required unless it appears that some malfunction has occurred. The output of the discriminator will be sampled at regular intervals. The exact sampling rate can be tailored to fit the type of projectile used and the desired accuracy. A clock with a frequency of 100 Hz gives a resolution of better than 4 meters for a 175 mm gun. These samples will determine the time of zero doppler and provide redundance data for statistical purposes and for interpolation or extrapolation in the event of loss of signal due to interference at the actual time of zero doppler. Thus, frequency vs voltage characteristic becomes frequency vs time, and the time of zero doppler can be determined for each observer.

In addition to this sampling, the output of the discriminator will be monitored and used to trigger pulses as long as the output is within prescribed limits of zero. These pulses will be correlated with the time code to set boundaries on the time of zero doppler. They will also give a second measurement of the time of zero doppler because of correlation with the time code. Correlation with the time code will establish that portion of the trajectory in which the doppler frequency was essentially zero. The correlation of these pulses not only sets limits on the time of zero doppler but also gives a first estimate of the observer's coordinate by interpolation. For example, if these pulses occur at a time early in the trajectory, then the time of zero doppler occurs early in this specific time period. A very good estimate can be obtained from a prior knowledge of the trajectory. If these pulses occur exactly at the midpoint of the trajectory, then the time of zero doppler is exactly in the middle of this time period. Thus, we get a "coarse" and "fine" measurement of the observer's coordinate. The large number of samples obtained by continually sampling the discriminator gives a "very fine" measurement of the observer's coordinate. Thus, there will normally be at least two separate measurements of zero doppler for each observer and for each projectile.

Figure 11:
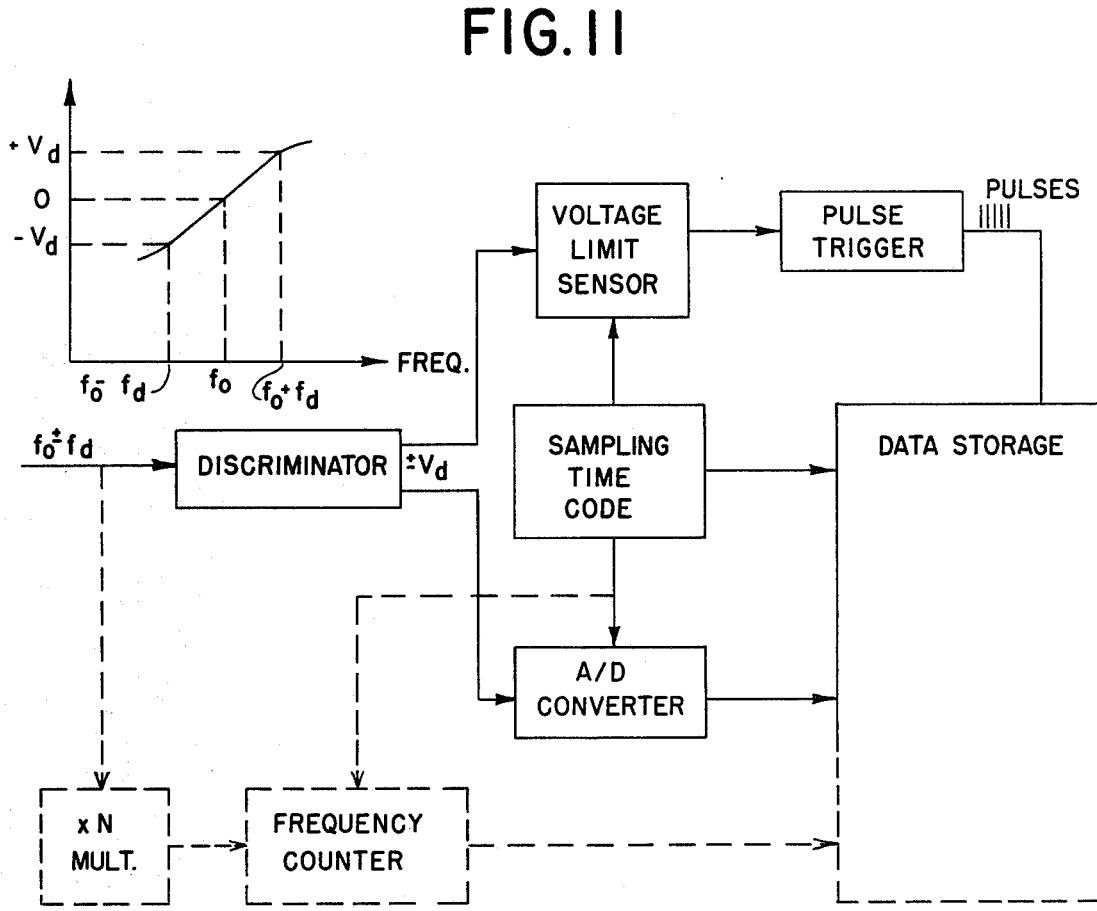
FIG. 11 is a block diagram of the circuit for detecting zero doppler.

The actual counting of cycles is still a third method which could be used for additional redundancy to provide more data for averaging or as a backup in case of failure in some other part of the system (e.g., the discriminator). One method for hardware implementation to determine the time of zero doppler is shown in FIG. 11. The cycle-counting portion is shown in dotted lines to indicate that it is not expected to be essential.

FIG. 11 is a block diagram showing the essential functional elements of the system constituting the present invention. Referring to the figure, a discriminator receives a doppler signal or a signal representative of the doppler signal ($f_o \pm f_d$) which has been received and preprocessed by standard doppler receiver subassemblies (antenna, preamp, tracking filter with phase lock loop, mixers, oscillators, limiters, multipliers, etc., not illustrated). The word "discriminator" is used in the generic sense; that is, it includes phase shift discriminators, ratio detectors, etc., whose output is a voltage ($\pm v_d$) which is a linear function of the input frequency ($f_o \pm f_d$) as shown above discriminator. This output voltage ($\pm v_d$) is divided and fed to two circuits, a voltage limit sensor and an analog to digital (A/D) converter. The discriminator output voltage ($\pm v_d$) can be of a single polarity, that is, either all positive or all negative as desired without changing the scope of this invention. Likewise, the discriminator voltage ($\pm v_d$) can be fed into an amplifier (not shown) before being divided and then fed to the voltage limit sensor and the A/D converter. The output of each of these circuits is a measure of the doppler frequency ($f_o \pm f_d$) in terms of voltage. This may be sufficient for some applications.

The voltage limit sensor is used to identify a specific range of doppler frequencies, that is, it opens and closes like a switch or gate at preset voltages (e.g., +0.01 v and −0.01 v) which corresponds to doppler frequencies above and below the zero doppler frequency; and hence, represents a coarse measurement of the doppler frequency. The voltage limit sensor can be preset to determine any desired voltage. Therefore, any desired doppler signal, not only the zero doppler, can be determined. Likewise, it can be expanded to determine or identify any number of doppler signals. However, since the instant application is the determination of the time at which a specific doppler frequency (zero doppler) occurs, a sampling time code is provided. This sampling time code block represents the time code which is transmitted to the observer's position as indicated in FIGS. 2 through 7. It should be noted that in some applications this sampling time code could be generated locally within the observer's receiver. This sampling time code is passed through the voltage limit sensor to a pulse triggering circuit which also serves as a buffer for interfacing with the data storage device. The pulse triggering circuit provides a series of pulses which are stored in the data storage device. Simultaneously, the time code is also stored in the data storage device for correlation with the pulse to set boundaries on the time of zero doppler of any other doppler frequency desired. Thus, these trigger pulses correspond to the time code and also provide a finer resolution of both the doppler signal (zero doppler in this instance) and a finer resolution of the time at which the doppler signal was received.

Actually, the Pulse Trigger in this application is designed to respond to each word of the time code rather than each bit in the word by means of a delay (simply the circuit time constant). Hence, it responds to the envelope of the time code and thus, acts as an envelope detector. The actual, complete word of the time code is stored directly into the data storage device. The pulses from the Pulse Trigger also permit statistical averaging to reduce the effects of noise in the output of the discriminator. Also, correlation with the time code will permit the application of a weighting factor to these statistics. A simple example which has been verified by modeling will illustrate how this provides a finer measurement.

Suppose that a source for a doppler signal is traveling straight over the observer. Further, let us suppose that the total time of the doppler signal is 100 seconds ($10^5$ ms) and the voltage limit sensor passes 2000 pulses corresponding to a 2 second or 2000 millisecond interval which correlates with the time code words for $49 \times 10^3$ and $51 \times 10^3$ ms. In this particular case the desired information (time of zero doppler) is at the midpoint or average value of the data because of symmetry. Now let us take a more complicated example. Suppose the source is traveling on a parabolic path and does not pass directly over the observer but at an angle of 45 degrees between the observer and the origin. Let us assume that the voltage limit sensor now passes 3000 pulses corresponding to a 3 second or 3000 millisecond interval which correlates with the time code word for $23.5 \times 10^3$ ms and $26.5 \times 10^3$ ms. Again, a simple statistical average will provide a better estimate of the desired information (time of zero doppler), namely, $25 \times 10^3$ ms. However, because of modeling studies, we know that the data must be weighted toward the earlier part of the data. Physically this can be explained by considering that the rate of change of the doppler signal is more rapid in the early part of the 3 second interval due to the faster rate of change of the radial velocity vector. This has been verified by modeling studies. Hence, an even finer measurement of the time of zero doppler is $24.5 \times 10^3$ ms. The numbers are used in these examples are illustrative of the order of magnitude of the numbers to be used in a specific application. However, no specific limit on the number or size of the data samples is implied by these examples.

The rate of the time code is a constant and controlled by a stable source. The source can be a local oscillator; it can be derived from a separate signal transmitted from an external source; it can be derived from modulation on the signal which is doppler shifted. In the instant application, the basic frequency of the time code is 1 kilohertz. However, any desired frequency can be used. Likewise, a conventional binary code is used in the instant application. However, almost any type of code could be used. It is not appropriate to describe all the possible codes which could be used; even a psuedo-random code could be used.

Thus, it can be seen that the time code and its stable rate permits both the determination of the zero doppler (or any other doppler frequency) and the time of zero doppler (or any other doppler frequency) by setting the limits for a coarse measurement and giving a fine measurement with the pulses to provide resolution between the limits set by the voltage limit sensor. Reliability is improved because the time code is known. Thus, it can be reconstituted in the event that part of it is lost or distorted due to some malfunction.

The second output of the discriminator, which is an analog voltage identical to the voltage sent to the voltage limit sensor, is fed to the A/D converter. This A/D converter actually functions as a digital voltmeter. It simply digitizes a slowly changing analog input voltage which corresponds to a specific doppler frequency as determined by the discriminator. This part of the system functions continuously throughout the reception of the doppler signal but is sampled at discrete intervals controlled by the sampling time code. Naturally, this rate of sampling cannot exceed the total settling time of the A/D converter and the data storage device. However, an extremely large number of samples can be taken in a short period of time in order to reduce the effects of noise in the output of the discriminator by statistical techniques. In addition, other forms of interpolation, such as the method of least squares, can be applied to the relatively large number of samples thus obtained, and thereby provide a very fine measurement of zero doppler plus the entire doppler curve. Again, no specific limit on the number data samples is implied. The limit will usually be determined by the capacity of the data storage device. The A/D converter portion also provides added reliability because it acquires data over a larger portion of the transmission of the doppler signal. Hence, it provides the capability of extrapolating or interpolating the doppler data to determine zero doppler (or any other doppler frequency) in case of a partial failure or interruption in the transmission of the doppler signal.

The dotted line portion of FIG. 11 represents the conventional method for measuring a doppler signal. This dotted line portion will operate simultaneously with the solid line portion to provide greater reliability by insuring the acquisition and separate storage of data in the event of a catastrophic failure in the solid line portion.

In addition to increased reliability, the three separate measurements thus obtained provide separate, independent measurements of the same physical quantity which can be used to obtain a better solution by simple averaging or by applying a weighting factor which can be determined during the calibration of each receiver. It should be noted that the instant invention is easily calibrated simply by the transmission of stable, known frequencies or the use of locally generated frequencies such as can readily be obtained from a frequency synthesizer.

Although this invention concerns the use of dual projectiles and intersecting planes for locating an observer, under special situations where azimuth data is available for the observer, observers can be located by firing a single projectile.

This single-shot technique is described for special situations which can easily occur because of the nature of military as well as surveying operations. It is the nature of these operations to control and use elevated positions for observation. Thus, there is a good probability that the azimuth from the gun to some observers can be determined with standard equipment (e.g., surveyor's transit). The necessary azimuth information can also be obtained through some intervisible point such as an observation post on a commanding terrain feature (a mountain ridge, for example) or by a helicopter which can rise high enough to see other observers or targets. Then, with this azimuth information and a single shot of one projectile, the relative positions of the gun and the observers can be determined.

Figure 8:
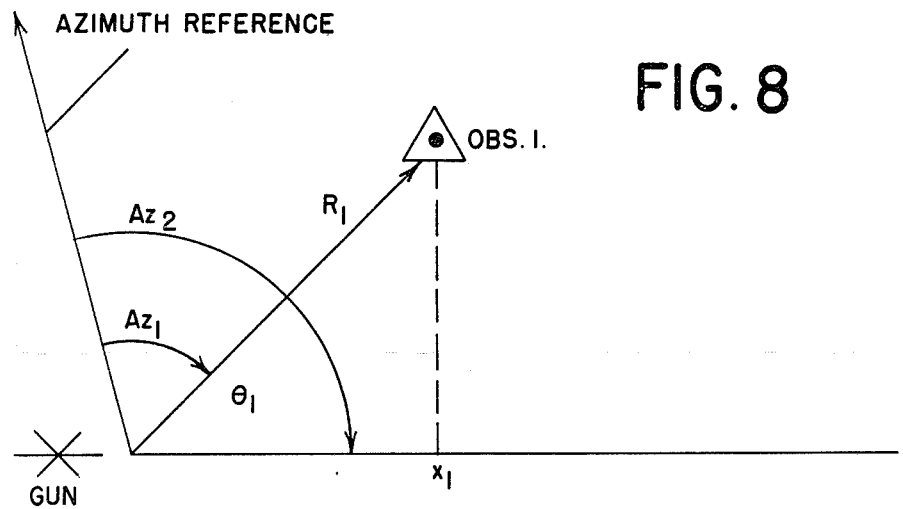
FIG. 8 illustrates the geometry involved in determining the position of an observer knowing the azimuth from a base station to the observer using a single projectile.

The basic concept (FIG. 8) is when the azimuth from the gun to an observer is known or measured by standard equipment. In this case, the range to the observer is determined from the following relationship:

$$R_1 = x_1 \sec \theta_1 \qquad (A\text{-}1)$$

where $R_1$ = the range from the gun to the observer.

$x_1$ = observer's distance along the subtrack (X-axis) obtained by a single shot with one projectile.

$\sec \theta_1$ = the secant of the angle between the subtrack and the azimuth from the gun to the observer.

Figure 9:
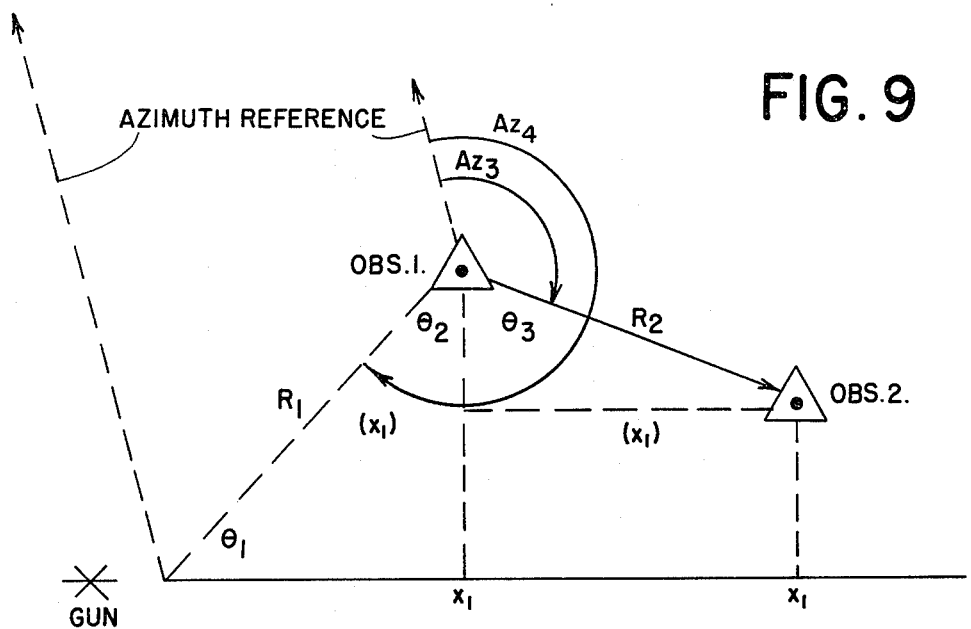
FIGS. 9 and 10 illustrate the geometry involved in determining the position of an observer, not visible from a base station, requiring the use of an intervisible observer.
Figure 10:
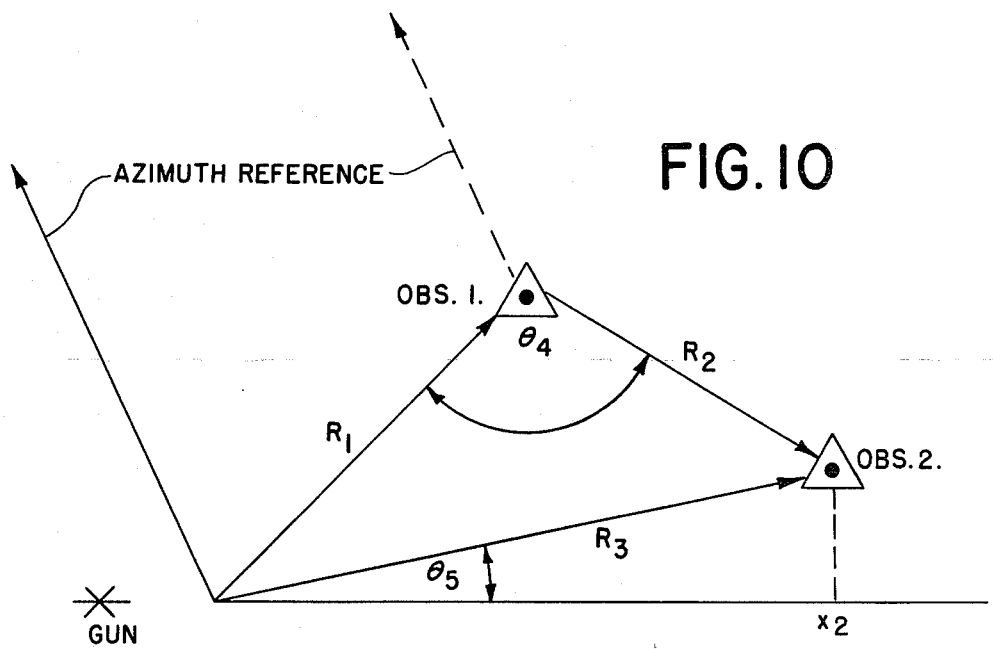

The geometry for obtaining the range from the gun to an observer with an intervisible point is shown in FIGS. 9 and 10. In this case, the mathematics is somewhat more involved because the range, $R_1$, from the gun to the intervisible observer is calculated first; then the range, $R_2$, from the intervisible observer to a second observer is calculated; and finally, the range, $R_3$, and azimuth, $Az_5$, from the gun to the second observer is calculated.

The first range, $R_1$, is calculated as described above in equation (A-1). The second range, $R_2$, is calculated from the following equation:

$$R_2 = (x_2 - x_1) \csc \theta_3 \qquad (A\text{-}2)$$

where $R_2$ = the range from the first observer to the second observer.

$x_1$ and $x_2$ = the distances of observer no. 1 and observer no. 2 along the subtrack obtained by the single shot with one projectile.

$\csc \theta_3$ = cosecant of the vertex angle opposite the side $x_1 x_2$.

The angle, $\theta_3$, is obtained from the following equation:

$$\theta_3 = Az_4 - Az_3 - \theta_3 \qquad (A\text{-}3)$$

where $\theta_3$ = the unknown angle opposite the side $x_1 x_2$.

$Az_4$ = the back azimuth from the first observer to the gun (i.e., $Az_1 + 180°$).

$Az_3$ = the azimuth from the first observer to the second observer.

$\theta_2 = 90° - \theta_1$ where $\theta_1$ is the angle between the subtrack and the azimuth from the gun to the first observer.

The range, $R_3$, from the gun to the second observer can now be calculated by the Cosine Law:

$$R_3^2 = R_1^2 + R_2^2 - 2R_1 R_2 \cos \theta_4 \qquad (A-4)$$

where $R_3$ = the range from the gun to the second observer.

$R_1$ and $R_2$ = the ranges determined from eqs. (A-1) and (A-2).

$\theta_4$ = the sum of the angle $\theta_2$ and $\theta_3$ which were previously determined or, simply, $Az_4 - Az_3$.

The angle, $\theta_5$, between the subtrack and the second observer can now be determined from the following expression:

$$\theta_5 = \cos^{-1}(x_2/R_3) \qquad (A-5)$$

where $\theta_5$ = the angle between the subtrack and the second observer.

$x_2$ = the second observer's distance along the subtrack obtained by the single shot with one projectile.

$R_3$ = the range from the gun to the second observer obtained from eq. (A-4) above.

The second observer's azimuth, $Az_5$, is simply the difference between the gun's azimuth and $\theta_5$:

$$Az_5 = Az_2 - \theta_5 \qquad (A-6)$$

where $Az_5$ = the azimuth from the gun to the second observer.

$Az_2$ = the azimuth of the projectile.

$\theta_5$ = the angle between $Az_2$ and the second observer's position.

Thus, there is now sufficient data (i.e., range, $R_3$, and azimuth, $Az_5$) to fire on targets for the second observer. Hence, any number of observers can be located with one projectile if the azimuth information is known or can be determined with other standard equipment.

Transmitting equipment capable of performing under the high-g environment of an artillery projectile are the self-contained type used in proximity fuze and telemetry applications and have a radio frequency output of about 290 milliwatts with a maximum frequency of about 2.4 GHz. A frequency range of 0.9 to 1.2 GHz is preferred as equipment in this range is easier to build and this range provides a reasonable doppler shift which can be multiplied in the receiving equipment before detection. A problem encountered in such equipment when applied to doppler techniques is that of frequency stability. While frequency stability is critical, it is relatively short-term, i.e., the time of flight of the projectile, probably of the order of 2 minutes. In some high-g applications quartz crystal controlled transmitters have been found adequate. However, this problem is overcome through a number of ways including special stabilizing feedback circuitry, which allows some frequency fluctuation but monitors the frequency at a known point with respect to the launching site which may involve a distance of about 100 to 200 meters. Then any frequency deviation other than that due to doppler would represent deviations due to oscillator fluctuations. Further, if fluctuations are truly random they will tend to average out as heretofore described with respect to receiving equipment. A further solution to the problem of frequency stability is that employed in the embodiments illustrated in FIGS. 5, 6 and 7 wherein a transponder, which transmits signals automatically upon receiving proper interrogation signals, receives very stable frequency signals transmitted from a ground base station to the projectile. The oscillator in the projectile would be phase locked or injection locked to the signal transmitted from the base station.

Antennas appropriate for the described system include forward-looking (point mounted), side-looking (point mounted) and rear-looking (base mounted). A satisfactory arrangement is the side-looking type which is a stripline ring which can be mounted coaxially to be symmetrical with the spin axis of the projectile to eliminate additional doppler effort due to spin.

Power supplies of conventional type are satisfactory for use in the system.

This system is easily and quickly calibrated in the field by the user immediately before and immediately after each measurement. The calibration procedure is simple and straightforward. The basic oscillator frequency, $f_o$, which is to be transmitted by the projectile during its flight is first transmitted to all observers. Each observer tunes his receiver for maximum sensitivity and then calibrates his discriminator to obtain a sharp null (i.e., zero output) for this frequency, $f_o$. This will calibrate his receiver for the point of zero-doppler. In addition to the basic frequency, $f_o$, a series of frequencies above and below the basic frequency will be transmitted. These frequencies will include the extreme values of the doppler frequency and will provide additional calibration points for the observer's discriminator. All observers will calibrate simultaneously. Actually, all calibration frequencies could be transmitted simultaneously but would require more sophisticated equipment. In addition to the calibration frequencies, the transmitter will also transmit the time code which will be transmitted again during the flight of the projectile. This time code will be received and stored by each observer for comparison with the time code during actual flight. This will provide redundancy in the event of loss of time signal during actual flight. The whole procedure should require only a few minutes to calibrate any number of observers.

The calibration procedure serves to illustrate some of the advantages of the system. In the event of compromise of the basic oscillator frequency or the time code (that is, should the enemy obtain this information), we simply select a new basic oscillator frequency and time code which are then transmitted to all observers immediately before firing the projectile. No physical modification of the hardware by technicians or other specialists is required. Everything can be performed by user personnel. Thus, we have speed and flexibility which are advantages from a tactical standpoint and simplicity of operation which is an advantage from a user standpoint.

The exemplary embodiments described in detail herein are merely illustrative of the system of this invention, of course. For example, in the fourth embodiment, FIG. 5, in addition to determining the time when the reference frequency is received, the times of specific preselected doppler frequencies above and below the reference frequency will also be measured. This, together with the change and rate of change in the doppler frequency, plus the actual counting of cycles to get the change in slant range permits an overdetermined solution for the trajectory. In addition a direct and extremely accurate measurement of muzzle velocity is obtained. Muzzle velocity alone provides one solution for the trajectory and is essential in the determination of times of zero doppler. Likewise, it will be appreciated that the system of this invention is thus conducive to more detailed and rigorous analysis for more precise applications. In particular, the system may be adapted to afford continuously changing projectile velocity information rather than average value velocity information. In addition, information regarding the actual, non-parabolic, real path of the projectile may be utilized in the analysis so that a more exact point of zero doppler (time and x, y, z coordinates) may be determined. It has been determined that such modification provides greater accuracy in the measurement and solution of trajectories and the location of observers by modeling several weapons. Obviously, the system of this invention is not restricted to the particular projectile launch means disclosed herein. The 8-inch howitzer and the 155 mm howitzer weapons have been determined to be suitable launch means. It is important to recognize that there is no limit to the number of observation posts which can be located by firing only two projectiles. It is also important to recognize that accurate muzzle velocity and trajectory are required for other military application.

I claim:

1. An electrical circuit for determining time of zero doppler frequency at a fixed position comprising:
   a. a doppler frequency receiving means having a data storage means;
   b. determining circuit means including preset voltage response means and analog to digital converter means, said preset voltage response means and said analog to digital converter means in parallel connection for determining time of zero doppler frequency at a fixed position; and
   c. first circit means connected between said doppler frequency receiver means and said determining circuit means for determining time of zero doppler frequency, said first circuit means having an output voltage which is a linear function of the received doppler frequencies, the output voltage activating said determining circuit means to provide a predetermined doppler frequency range determined by said preset voltage response means.

2. In a system for determining position location, electrical circuit means for receiving electrically generated doppler frequencies and determining the time of zero doppler at an unknown position comprising:
   a. doppler frequency receiving means having a data storage means;
   b. first circuit means connected to said doppler receiver, said first circuit means having an output voltage which is a linear function of the doppler frequency input from said doppler receiver;
   c. voltage limit sensor means and analog to digital converter means connected to the output of said first circuit means for simultaneous activation by the voltage output of said first circuit means, said voltage limit sensor means having a preset voltage range to pass a predetermined range of doppler frequencies to provide a coarse measurement of the time of zero doppler at an unknown position;
   d. sampling time code circuit means includes a stable oscillator connected to said analog to digital converter means, said voltage limit sensor means and to said data storage means, the coded output of said sampling time code circuit means passing through said voltage limit sensor means for correlation with output pulses of said voltage limit sensor means for fine measurement of the time of zero doppler at an unknown position, said analog to digital converter means responsive to the output of said sampling time code circuit means and upon activation by said sampling means digitizes analog input voltages corresponding to doppler frequencies received by said first circuit means from said doppler frequency receiver, the output of said analog to digital converter means conducted to said data storage means; and
   e. pulse trigger circuit means connected to the output of said voltage limiter sensor means and generating pulses responsive to the time coded signals of said sampling time code circuit means correlated to the doppler frequency range determined by present voltage limits of said voltage limit sensor means, pulses generated by said pulse trigger circuit means conducted to said data storage means and correlated with the output of said sampling time code circuit means whereby time of zero doppler at an unknown position may be determined.

3. In a system for determining position location, electrical circuit means for receiving electrically generated doppler frequencies and determining the time of zero doppler at an unknown position comprising:
   a. doppler frequency receiver means having a data storage means;
   b. first circuit means connected to said doppler receiver, said first circuit means having an output voltage which is a linear function of the doppler frequency input from said doppler receiver;
   c. voltage limit sensor means and analog to digital converter means connected to the output of said first circuit means for simultaneous activation by the voltage output of said first circuit means, said voltage limit sensor means having a preset voltage range to pass a predetermined range of doppler frequencies to provide a coarse measurement of the time of zero doppler at an unknown position;
   d. sampling time code circuit means including a stable oscillator connected to said analog to digital converter means, said voltage limit sensor means and to said data storage means, the coded output of said sampling time code circuit means selectively conducted through said voltage limit sensor means and correlated with such output for fine measurement of the time of zero doppler at an unknown position; and
   e. pulse trigger circuit means connected to the output of said voltage limit sensor means for detecting the modulated output thereof and generating pulses responsive to detection of such modulated output, pulses generated by said pulse trigger circuit means conducted to said data storage means and correlated with the output of said sampling time code circuit means whereby the time of zero doppler at an unknown position may be determined.

4. The system as recited in claim 2 further comprising:
   a. frequency multiplier means connected to the output of said doppler frequency receiver means;

b. frequency counter means connected to the output of said frequency multiplier means and to the output of said sampling time code circuit means for correlating said sampling time code with doppler frequencies applied to said frequency counter, the output of said frequency counter connected to said data storage means whereby time coded doppler frequencies are conducted to said data storage means for determining time of zero dopppler at an unknown position.

* * * * *